United States Patent
Belanger et al.

(10) Patent No.: US 7,343,656 B2
(45) Date of Patent: Mar. 18, 2008

(54) MULTIPLE FACE THREE-AXIS CNC MACHINE

(75) Inventors: Donald R. Belanger, Merrimack, NH (US); David M. Lorenzo, New Boston, NH (US); Ronald L. Downing, Merrimack, NH (US)

(73) Assignee: George Gordon Associates, Inc., Merrimack, NH (US)

( * ) Notice: Subject to any disclaimer, the term of this patent is extended or adjusted under 35 U.S.C. 154(b) by 591 days.

(21) Appl. No.: 10/794,955

(22) Filed: Mar. 5, 2004

(65) Prior Publication Data

US 2005/0197734 A1    Sep. 8, 2005

(51) Int. Cl.
*B23P 23/00*   (2006.01)
*B23C 1/00*    (2006.01)

(52) U.S. Cl. .................. 29/27 C; 409/201; 409/211; 451/363; 29/40

(58) Field of Classification Search ............. 29/27 C, 29/26 A, 40; 901/27, 28, 29, 30, 31, 39, 901/40; 451/363, 364, 365, 456, 494; 414/736, 414/737, 732, 738; 483/1, 14, 18, 22, 49, 483/901; 409/201, 216, 211, 218, 231, 232, 409/233, 234, 903; 82/125
See application file for complete search history.

(56) References Cited

U.S. PATENT DOCUMENTS 4,636,135 A * 1/1987 Bancon .................. 414/730
4,646,422 A * 3/1987 McMurtry ................. 483/1
5,664,308 A * 9/1997 Deitert ..................... 29/40
5,791,843 A * 8/1998 Dreier .................. 409/218
6,302,005 B1  10/2001 Albasateneh
6,606,774 B2 * 8/2003 Batrin et al. .......... 29/407.1
2001/0046422 A1 * 11/2001 Colombo ............... 409/201

OTHER PUBLICATIONS

Web Site www.mazakusa.com—Variaxis 200 Product Literature.
Web Site www.americamachinist.com—"Chipping Away Cycle Times".
Web Site www.mmsoline.com—"Better Production—Manufacturer Halves Cycle Times with Machining Center".

* cited by examiner

*Primary Examiner*—Dana Ross
(74) *Attorney, Agent, or Firm*—Bourque & Associates (57) ABSTRACT

A CNC machine for automatically re-indexing and machining multiple faces of a workpiece includes a traditional three-axis CNC machine and a gripper tool. A bar stock defining a first and at least a second workpiece is loaded within a first and a second vice on the table such that the first workpiece is disposed within the first vice and at least a portion of the second workpiece is disposed within the first and the second workpiece. The CNC machine machines the first face of the workpiece within the first vice. Next, the CNC machine grasps the first workpiece using the gripper tool removably disposed within the spindle. The first workpiece is re-indexed and is loaded into a third vice disposed on the table and the next face of the first workpiece is machined. A support rack is preferably used to support a portion of the bar stock overhanging the table.

6 Claims, 14 Drawing Sheets

MULTIPLE FACE THREE-AXIS CNC MACHINE

TECHNICAL FIELD

The present invention relates to computer numerical control (CNC) machines and more particularly, relates to three-axis CNC machines capable of machining multiple faces on a single workpiece.

BACKGROUND INFORMATION

Computer numerical control (CNC) machines are widely used today in nearly all aspects of manufacturing. The main benefit offered by all forms of CNC machine tools is improved automation. This improved automation reduces the amount of operator intervention related to producing workpieces and therefore reduces the costs associated with the production of workpieces.

Figure 1:
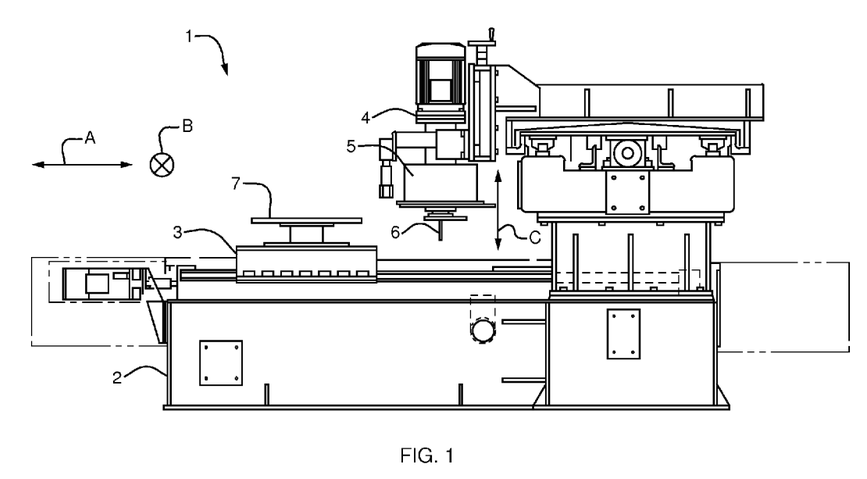
FIG. 1 is side plan view of a prior art three-axis CNC machine.

While there are a wide variety of CNC machines that perform various tasks, one of the most common types of CNC machines is a three-axis CNC machine 1, FIG. 1. A typical three-axis CNC machine 1 includes a base 2, a table 3 and a spindle 5. A workpiece 7 (typically a flat bar stock having six faces) is secured, generally with one or more vices (not shown), to the table 3 which is moveable along two axis A and B with respect to the base 2 (typically left to right and front to back respectively).

A motor 4 drives the spindle 5 which includes a removable tool 6 (typically an end mill or a drill bit) used to perform the machining. Multiple tools 6 (for example, various sizes and types of drill bits) are generally stored on a tool head (not shown). The CNC machine 1 may be programmed to change tools 6 during the machining process as necessary.

The spindle 5 typically moves in a third axis C with respect to the base 2 (typically up and down). Thus, the three axis in a typical three-axis CNC machine 1 are: A (the table 3 moving left/right); B (the table 3 moving back/forward); and C (the spindle 5 moving up/down).

While these known three-axis CNC machines 1 are common and fairly inexpensive, they suffer from several known problems. For example, during the machining of a workpiece 7, it is often necessary to perform several functions. For example, it is often necessary to cut the length of the bar stock to a desired length, create holes, channels, threads, etc. One problem with the known three-axis CNC machines 1 is that each workpiece 7 must be loaded onto a table 3 individually. Not only is the process of loading multiple tables 3 time-consuming since each table 3 must be loaded by hand, but it is also equipment intensive since it requires a large number of tables 3.

While the known three-axis CNC machines 1 are generally quite effective at performing machining tasks, it is often necessary to machine the workpiece 7 along multiple faces (e.g., the top, bottom, sides, and/or the ends). Unfortunately, traditional three-axis CNC machines 1 are only capable of machining one face of the workpiece 7 at time. As a result, the workpiece 7 must be removed from the table 3, re-indexed, and secured back on the table 3. Having to re-index the workpiece 7 has several downsides.

Firstly, re-indexing the workpiece 7 is time consuming. When producing multiple workpieces 7 having machining on more than one face, the CNC machine 1 must first machine a first face of all the workpieces 7 to be created. Next, a human/operator must reload all the unfinished workpieces 7 back into tables 3 and re-index the workpieces 7 (i.e., orient the workpieces 7 properly). The reloading/re-indexing process includes several drawbacks.

One problem is that the reloading/re-indexing process requires multiple tables 3 to be reloaded. As discussed above, the process of reloading multiple tables 3 is not only time consuming, but also equipment intensive. Moreover, should the CNC machine finish machining the first faces of the workpieces 7 during off-hours (i.e., when an operator is not present), then the CNC machine 1 must sit idle until it is reloaded.

Another problem is that the human/operator must re-index each workpiece 7 separately during the reloading process. This greatly increases the likelihood that a workpiece 7 may be improperly indexed and be destroyed. Lastly, the reloading/re-indexing process requires the CNC machine 1 to be shut down or stopped, thus reducing the overall efficiency of the CNC machine 1.

While four and five axis CNC machines that are capable of machining more than one face at a time are known, these known machines are very expensive. Additionally, these CNC machines also require specially designed stand-alone CNC machines. As a result, the existing traditional three-axis CNC machines 1 cannot be retrofitted to perform multi-faced machining. Because of this, many companies who have a large number of traditional three-axis CNC machines 1 are not willing to get rid of their existing CNC machines.

Accordingly, what is needed is an apparatus that solves the above problems and that is capable of machining more than one face of a workpiece. The apparatus should preferably be capable of being retrofitted with existing three-axis CNC machines. The apparatus should also preferably be capable automatically loading a bar stock such that individual workpieces do not have to be loaded into a table.

SUMMARY

The present invention features a CNC system capable of machining multiple faces of an object (preferably a bar stock defining a first workpiece and at least a second workpiece) and includes a CNC machine having a table having at least one vice sized and shaped to secure the bar stock and a spindle adapted to removably engage at least one tool. According to the preferred embodiment, the CNC machine is a traditional three-axis CNC machine wherein the table is movable along a first and a second axis A, B (wherein the first axis A is substantially perpendicular to, and in the same plane as, the second axis B) and the spindle is movable along a third axis C substantially perpendicular to the first axis A and the second axis B.

A gripper tool preferably includes a support body having a first end adapted to removably engage the spindle and a second end rotatably connected to a clamping device. The clamping device is sized and shaped to grasp at least a portion of the workpiece such that after the CNC machine machines a first face of the bar stock, the gripper tool grasps the workpiece within the clamping device, re-indexes the workpiece, and reloads the workpiece into a vice such that a new face of the workpiece may be machined. The clamping mechanism may include a magnetic device, a suction device, or a hydraulic device having a first and at least a second jaw sized and shaped to grasp the workpiece.

According to one embodiment, the gripper tool includes a hinge such that the clamping mechanism is adapted to move at an angle with respect to the axis C. In yet another embodiment, the gripper tool is rotatable about the axis C.

In the exemplary embodiment, the table includes a first, a second, and a third vice. The first and second vices are disposed a spaced distance apart and along a common axis such that the first workpiece is secured within the first vice and at least part of the second workpiece or remaining bar stock is secured within the first and the second vice. The gripper tool preferably picks up the first workpiece from the first vice, re-indexes it and/or rotates it, and places it into the third vice. Once secured within the third vice, a new face of the first workpiece is machined.

The present invention also features a method of forming a workpiece having multiple machined faces. The method includes loading a bar stock (preferably defining a first workpiece to be machined and at least a second workpiece to be machined) within at least one vice disposed on a table of a CNC machine (preferably a traditional three-axis CNC machine). Loading the bar stock preferably includes securing the first workpiece within a first vice disposed on the table and securing at least a portion of the second work within the first vice and a second vice disposed on the table.

Next, a first face of the first workpiece is machined within a vice disposed on the table (preferably the first vice) using at least one machine tool disposed within the spindle. Once the first face of the first workpiece has been completed, the first workpiece is repositioned and/or re-indexed such that a new face may be machined.

The machine tool is removed from the spindle and the first workpiece is grasped with a gripper tool removably connected to the spindle. Next, the first workpiece is released from the vice and is re-indexed and/or repositioned and loaded into a vice, preferably a third vice. Once the first workpiece is loaded into the third vice, the gripper tool is removed from the spindle and the new face of the first workpiece is machined.

In the preferred embodiment, the second workpiece is automatically loaded into the first vice. According to one embodiment, the second workpiece is automatically loaded by first positioning the bar stock beneath the spindle such that the center of the spindle is positioned at a distal end of the second workpiece. Next, an aperture is formed at the distal end of the second workpiece. A pin is secured within the spindle and is inserted at least partially within the aperture. The first and the second vices are released and the table is moved such that the second workpiece is positioned within the first vice. The bar stock does not move relative to the spindle. According to an alternative embodiment, the second workpiece is automatically loaded by first grasping a proximate end of the second workpiece with the gripper tool. The first and the second vices are released and the table is moved such that the second workpiece is positioned within the first vice.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 2A:
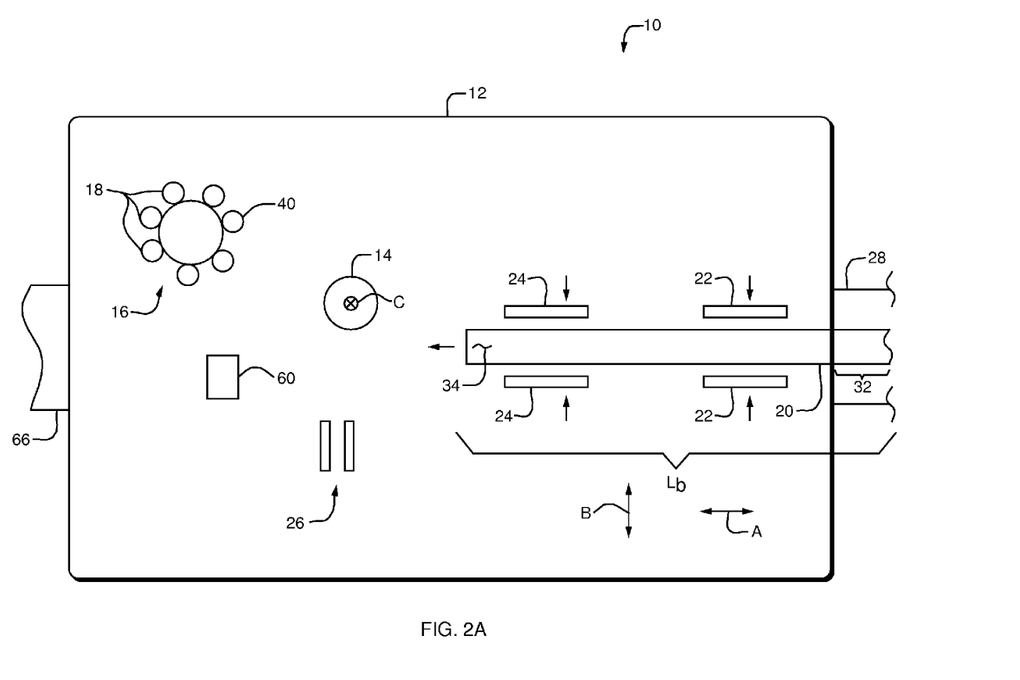
FIG. 2A is a top plan view of one embodiment of the CNC machine according to the present invention.
Figure 2B:
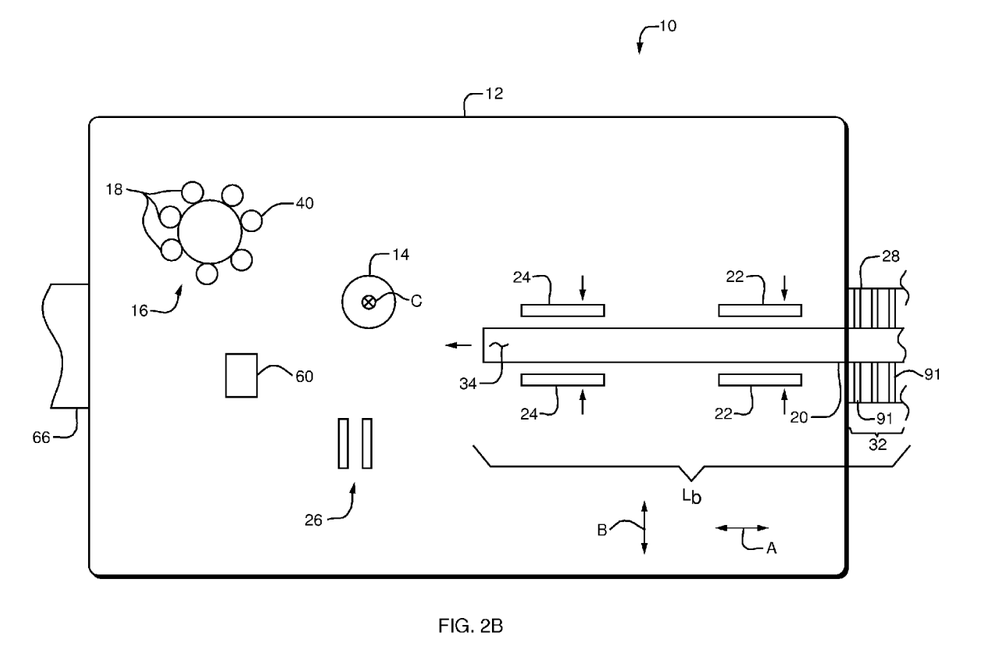
FIG. 2B is a top plan view of the CNC machine shown in FIG. 2A having a support section including plurality of rollers.
Figure 2C:
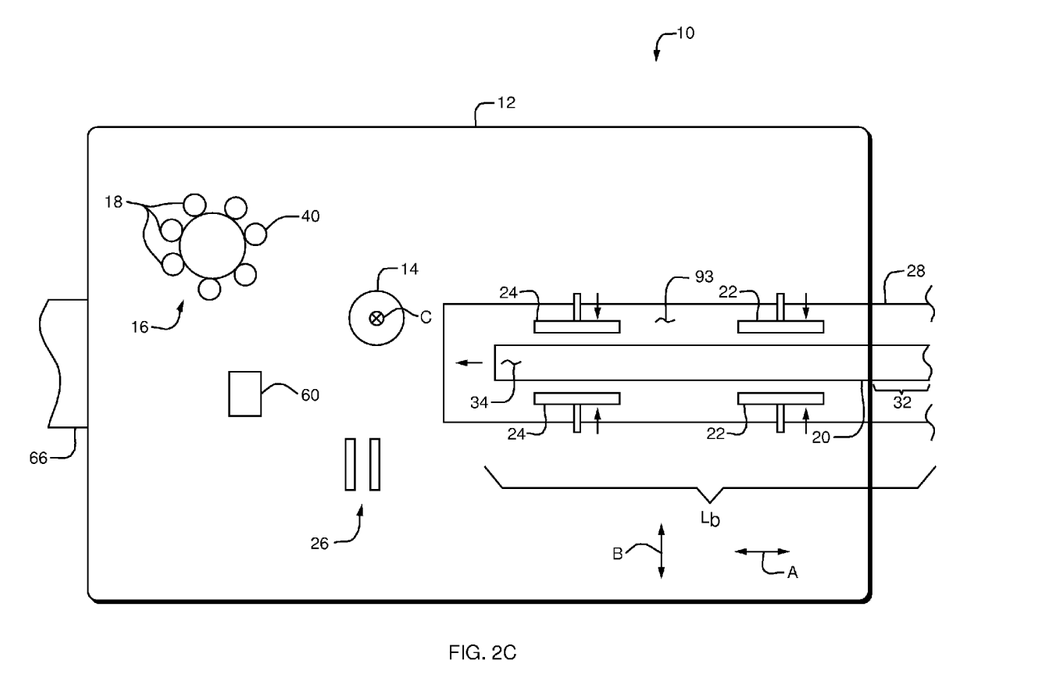
FIG. 2C is a top plan view of the CNC machine shown in FIG. 2A having a support section including a conveyer belt.
Figure 3:
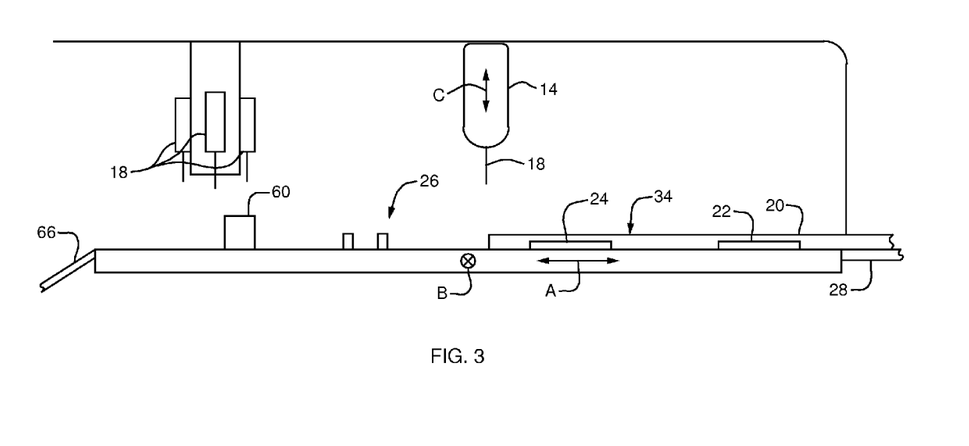
FIG. 3 is a side plan view of the CNC machine shown in FIG. 2 according to one embodiment of the present invention.

The CNC machine 10, FIGS. 2-3, according to the present invention, is capable of automatically (i.e., without the need of human/operator intervention) machining two or more faces of a workpiece 20 without the need to have the workpiece 20 manually re-indexed or re-loaded. The CNC machine 10 according to the present invention is also capable of being retrofitted to existing, traditional three-axis CNC machines and does not require a specially designed stand-alone CNC machines. It should be noted that while a traditional three-axis CNC machine is capable of machining the top face, and to some degree the bottom face, they are very limited in how it can machine the bottom surface since they can only machine the bottom face through the top face (i.e., traditional CNC machines can only "machine" the bottom surface while drilling a hole or the like through the top surface all the way to the bottom surface). The CNC machine 10, according to the present invention, is capable of machining all the faces of an object independent of the other faces.

According to the preferred embodiment, the CNC machine 10 includes a traditional, three-axis CNC machine and will work with any known three-axis CNC machines. The details of traditional CNC machine are well known to those skilled in the art and, for the sake of brevity, will not be discussed in detail except where relevant. It should be noted that the present invention will also work with other types of CNC machines such as, but not limited to, four and five axis CNC machines.

The CNC machine 10 includes at least one table 12 and at least one spindle 14. While the present invention will be described with respect to a single table 12 and a single spindle 14, multiple tables 12 and/or multiple spindles 14 are also possible and any modifications necessary are within the knowledge of one skilled in the art. The table 12 preferably moves left to right as shown by the arrow A (the first axis of the three-axis CNC machine) as well as front to back as shown by arrow B (the second axis of the three-axis CNC machine).

The spindle 14 is connected to a motor (not shown) and moves up and down in the direction of the arrow C (the third of the three-axis CNC machine). The end of the spindle 14 is adapted to be removably connected to at least one of a plurality of removable machining tools 18 (generally different sizes and types of drill bits, end mills, and the like) stored on a tool head 16 as is well known to those skilled in the art. During operation, the CNC machine 10 may be programmed to automatically exchange machining tools 18 with the tool head 16.

The table 12 preferably includes a bar vice 22, a part vice 24, and a secondary vice 26. As will be described in greater detail below, the vices 22, 24, 26 may include any known device for securing and releasing the material to be machined (hereinafter referred to as the bar stock 20 or workpiece 30) such as, but not limited to, a pneumatic vice, hydraulic vice, electro/magnetic vice, etc. While the vices 22, 24, and 26 are shown all disposed on a single table 12, the vices 22, 24, and 26 may be disposed on more than one table 12 and/or on the support rack 28 (described below). Additionally, while the present invention will be primarily described having three separate vices 22, 24, 26, other vice configurations are also envisioned including, but not limited to, combining the bar and part vices 22, 24 and orientating the secondary vice 26 parallel or perpendicular to the other vices.

Figure 4:
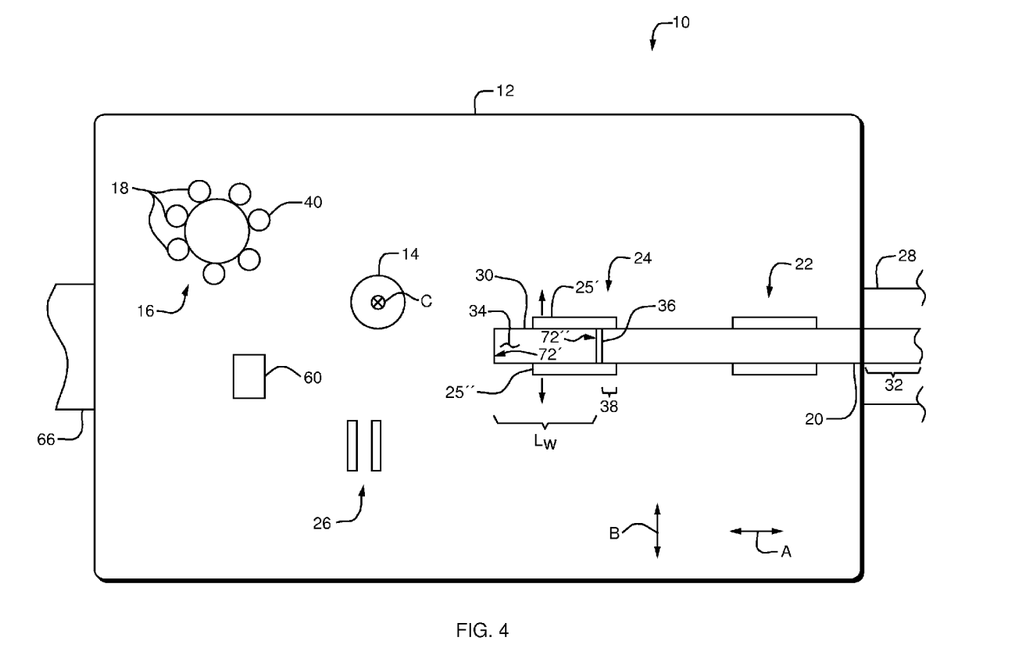
FIG. 4 is a top plan view of the CNC machine shown in FIG. 2 wherein the bar stock has been cut to length according to one embodiment of the present invention.
Figure 6:
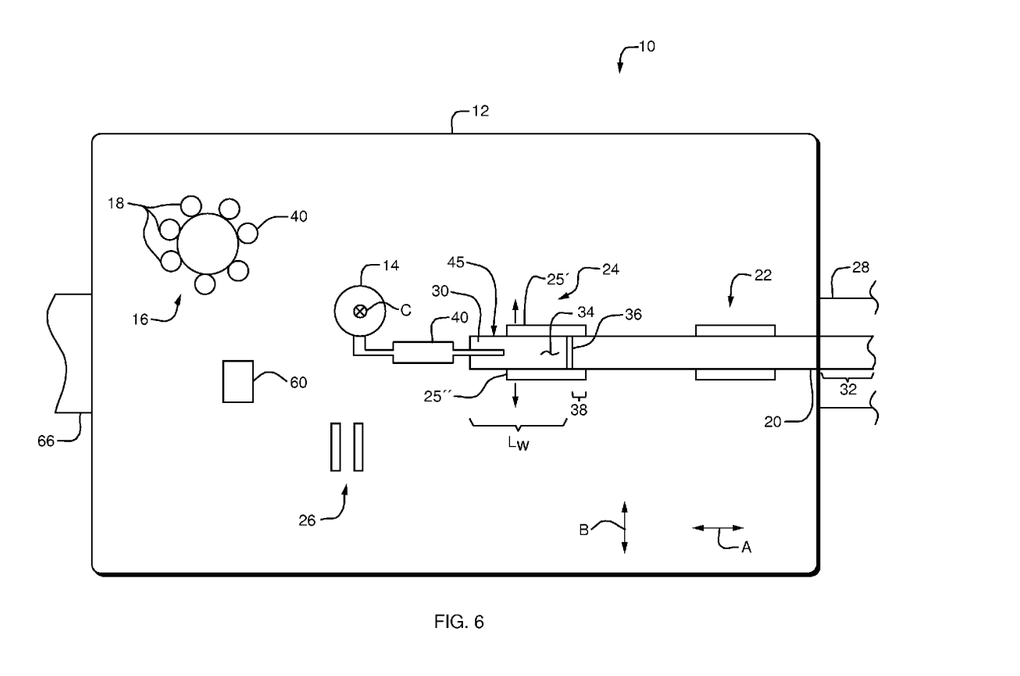
FIG. 6 is a top plan view of the gripping tool shown in FIG. 5 grasping the workpiece according to one embodiment of the present invention.

Initially, the bar and part vices 22, 24 are in an open position as shown in FIG. 2. The bar stock 20 is then loaded onto the table 12. Once the bar stock 20 is positioned with respect to the table 12, bar and part vices 22, 24 are closed in order to secure the bar stock 20 to the table 12. As can be seen in FIGS. 3-4 and 6, a portion 32 of the bar stock 20 may overhang the table 12. As will be discussed in greater detail, the combination of the bar vice 22 and part vice 24 allows the CNC machine 10 to securely grip the bar stock 20 while the table 12 is moved even when a portion 32 of the bar stock 20 overhangs the table 12.

Once the bar stock 20 is loaded within the bar vice 22 and the part vice 24, the CNC machine 10 preferably begins to machine the upper face 34 of the bar stock 20 by moving the table 12 in the directions of arrows A and B and by moving the spindle 14 in the direction of arrow C. During the machining process, spindle 14 may exchange machining tools 18 with the tool head 16 as necessary.

According to one embodiment, the CNC machine 10 preferably includes a support rack 28. The support rack 28 is used for supporting a portion 32 of the bar stock 20 when the bar stock overhangs the table 12. In particular, the support rack 28 is sized and shaped such that the overhanging portion 32 of the bar stock 20 is constantly supported even while the table 12 moves along the A and B axis. The support rack 28 is also in communication with the table 12 such that the CNC machine 10 may automatically load and index the bar stock 20 into the CNC machine 10 as will be discussed in greater detail below.

The support rack 28 may include rollers 91 (FIG. 2B) as is well known in the art. Alternatively or in addition to, the support rack 28 may include a conveyer belt 93 (FIG. 2C) According to one embodiment, the conveyer belt 93 may move the bar stock 20 onto the table 12 and optionally into the vices 22, 24. Alternatively, the workpieces 30 may be placed onto and stored on the conveyer belt 93 for additional machining at a later time. According to this embodiment, a gripper tool 40 (discussed in greater detail hereinbelow) can be used to secure workpieces 12 from the conveyer belt 93.

When the length $L_b$ of the bar stock 20 exceeds the length of the workpiece to be machined, the bar stock 20 may be cut to a predetermined length $L_w$ as shown in FIG. 4 to form the first workpiece 30. In the exemplary embodiment, the length $L_w$ of the bar stock 20 is preferably cut at a point 36 such that the workpiece 30 is at least clamped within the part vice 20 and at least a portion 38 of the bar stock 20 remains between the clamps 25 of the part vice 24. Having the portion 38 of the bar stock 20 clamped within the bar vice 22 allows the CNC machine 10 to secure the overhanging portion 32 of the bar stock 20 even while the table 12 is moved in the direction of arrows A and B as discussed above without the risk of the bar stock 20 twisting or moving with respect to the table 12.

Figure 7:
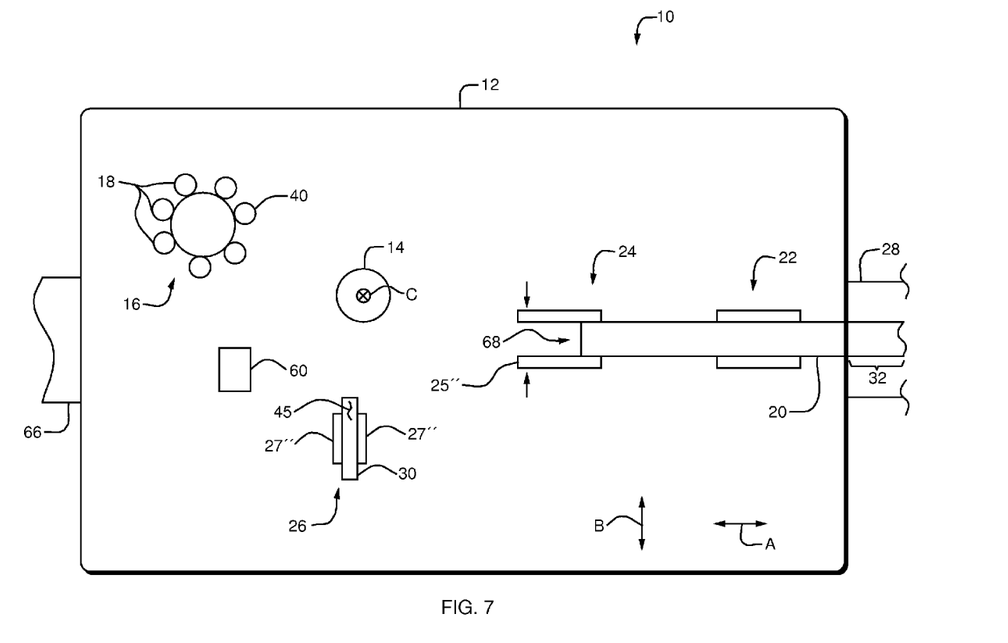
FIG. 7 is a top plan view of the workpiece shown within the secondary vice according to one embodiment of the present invention.
Figure 8:
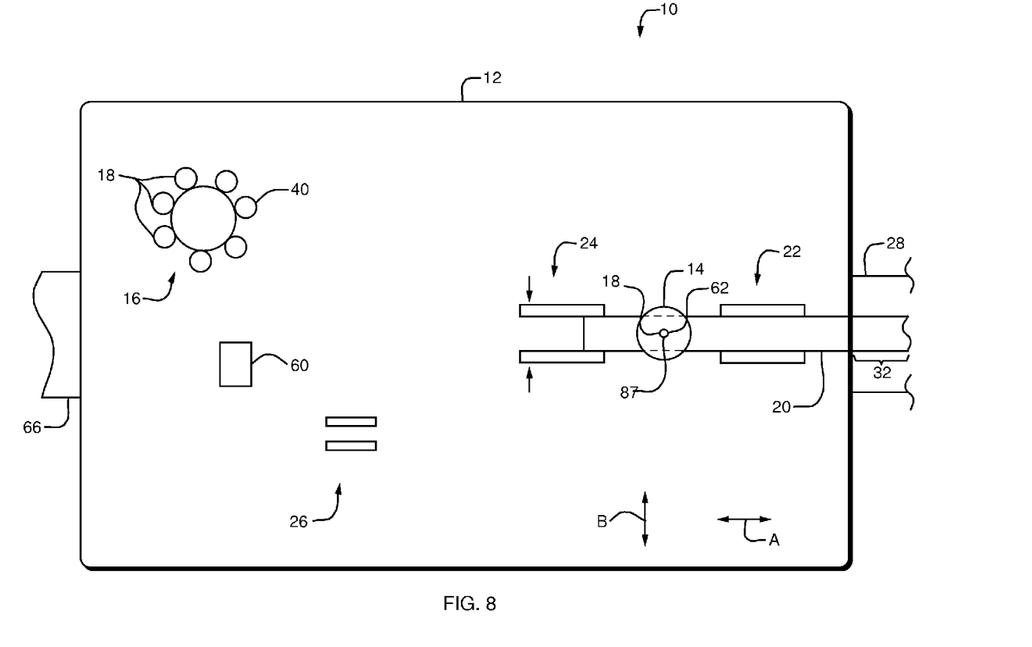
FIG. 8 is a top plan view of the CNC machine re-indexing and reloading the bar stock according to one embodiment of the present invention.

Once the upper face 34 of the first workpiece 30 has been machined, the CNC machine 10, FIG. 6, grasps the workpiece 30 within the part vice 24, releases the part vice 24, picks-up and rotates the workpiece 30, and automatically indexes the workpiece 30 within a vice such that a new face 45 of the workpiece 30 may be machined. In the preferred embodiment, the workpiece 30 is moved from the part vice 24 to the secondary vice 26, FIG. 7, between a pair of clamps 27, though the workpiece 30 may be inserted back into the part vice 24 depending on which face 34, 45 is to be machined next. The secondary vice 26 is used because the portion 38 of the bar stock 20 is preferably held within the part vice 24 and the workpiece 30 will generally have different dimensions on the different faces (e.g., the length, width, and depth will generally be different). Alternatively, if the portion 38 of the bar stock 20 is not held within the part vice 24 (for example, if the bar stock 20 is held in place relative to the table 12 by an alternative means such as a clamp disposed on the support rack 28 (not shown), if the bar vice 22 is located on a second table (not shown), or if the bar stock 20 does not move relative to the table 12), the first workpiece 30 may be placed back into the part vice 24 or may be placed into the secondary vice 26.

Figure 5A:
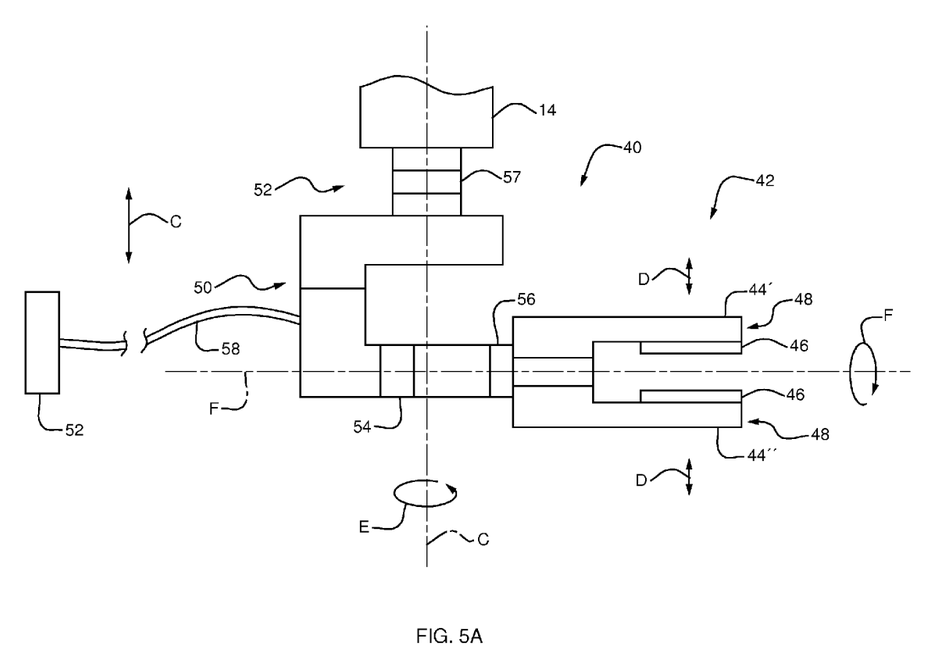
FIG. 5A is a side plan view of one embodiment of the gripping tool according to one embodiment of the present invention.

To reload and re-index the workpiece 30, the spindle 14 exchanges the existing machining tool 18 (generally a drill bit, end mill, or the like) with the tool head 16 and selects a gripper tool 40, FIG. 5A. The gripper tool 40 is preferably sized and shaped to fit within the tool head 16 such that the gripper tool 40 may be stored while not used. Alternatively, the gripper tool 40 may be stored in a separate holder (not shown). The gripper tool 40 also includes a movable clamping mechanism 42 that is sized and shaped to grasp at least a part of the first workpiece 30. It should be noted that while the gripper tool 40 will be described with respect to a mechanical clamping mechanism 42, other devices and methods of picking up the workpiece 30 are also envisioned such as, but not limited to, a magnetic gripper tool 40, a suction or air driven gripper tool 40, or any other device known to those skilled in the art.

According to one embodiment, the clamping mechanism 42 includes a first and at least a second arm or jaw 44, each preferably having a gripping surface 46 such as a high traction surface and/or a soft/deformable compound, disposed proximate the distal ends 48 of the arms or jaws 44. The arms or jaws 44 move generally in the direction of arrow D such that the arms/jaws 44 clamp against or otherwise secure the workpiece 30 within the clamping mechanism 42.

The gripping tool 40 also preferably includes a support body or section 50 having a first end 52 adapted to fit with the spindle 14. In the preferred embodiment, the support body/section 50 may rotate about the spindle 14 along the axis C in the direction indicated generally by arrow E. According to the preferred embodiment, the clamping mechanism 42 is rotatably secured to a second end 52 of the support body or section 50 such that the clamping mechanism 42 may rotate about an axis F transverse to the axis C in the direction indicated generally by arrow F. The spindle 14, and subsequently the gripping tool 40, may also move up and down with respect to the table 12 as previously described.

According to one embodiment, the gripping tool 40 includes a first and a second motor device 54, 56 connected to a power source 52. The first motor device 54 includes a motor and any necessary linkage/gears (and is within the knowledge of one skilled in the art) and preferably rotates the clamping mechanism 42 about the axis F. The second motor device 56 includes a motor and any necessary linkage/gears (and is also within the knowledge of one skilled in the art) and preferably opens/closes the arms/jaws 44. The gripping tool 40 is preferably rotated about the E axis by the spindle 14, though a third motor device 57, similar to those described above, may be used. In the preferred embodiment, the power source 52 is preferably connected via cables or the like 58. Alternatively, the power source 52 may be located within the gripping tool 40. It should be noted that the power source 52 may include an electrical power source or a hydraulic/air power source and is within the knowledge of one skilled in the art.

Figure 5B:
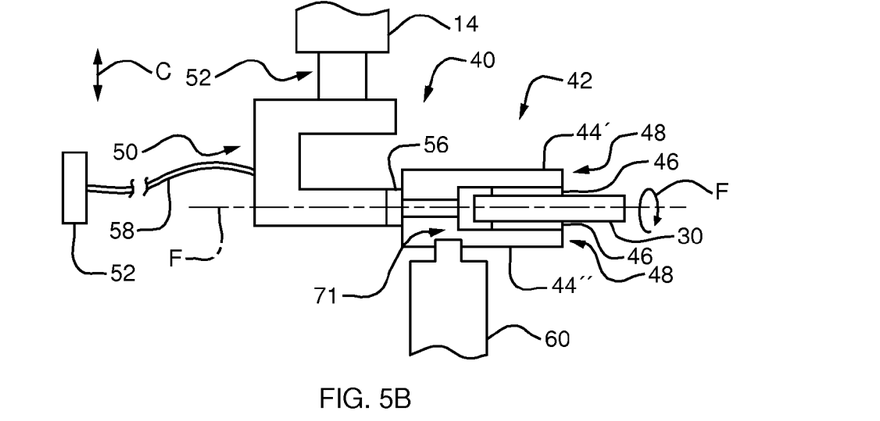
FIGS. 5B-5D are side plan views of another embodiment of the gripping tool shown in FIG. 5A in various positions as the gripping tool is rotated.
Figure 5C:
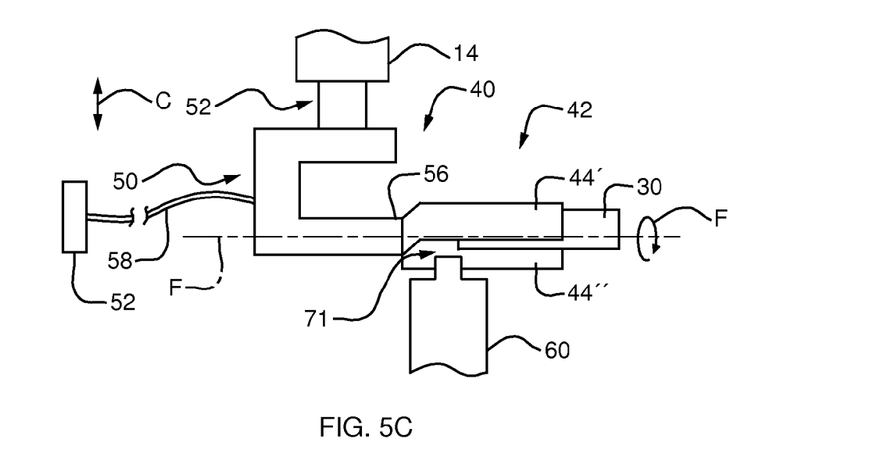
Figure 5D:
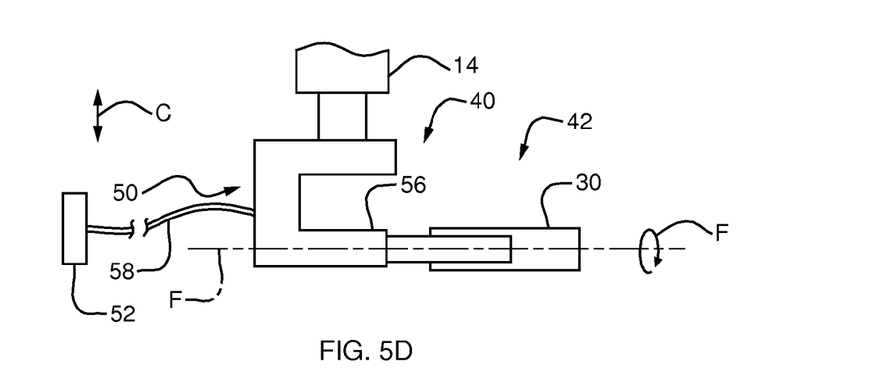

In an alternative embodiment, gripping tool 40 is secured to the spindle 14 and does not rotate. The gripping tool 40 moves up and down along the C axis. The table 12 is moved along the A and B axis. The clamping mechanism 42 is rotated using a post 60, FIG. 5B-5D, disposed on the table 12. According to this embodiment, clamping mechanism 42 is rotatably connected to the support body/section 50. The table 12 is moved along the A and B axis such that the post 60 contacts a portion 71 of the clamping mechanism 42. As the table 12 is moved along the A and B axis, post 60 pushes against the portion 71 of the clamping mechanism 42, thereby rotating the clamping mechanism 42 about the axis F. This process is repeated until the clamping mechanism 42 has been rotated the desired amount.

Figure 5E:
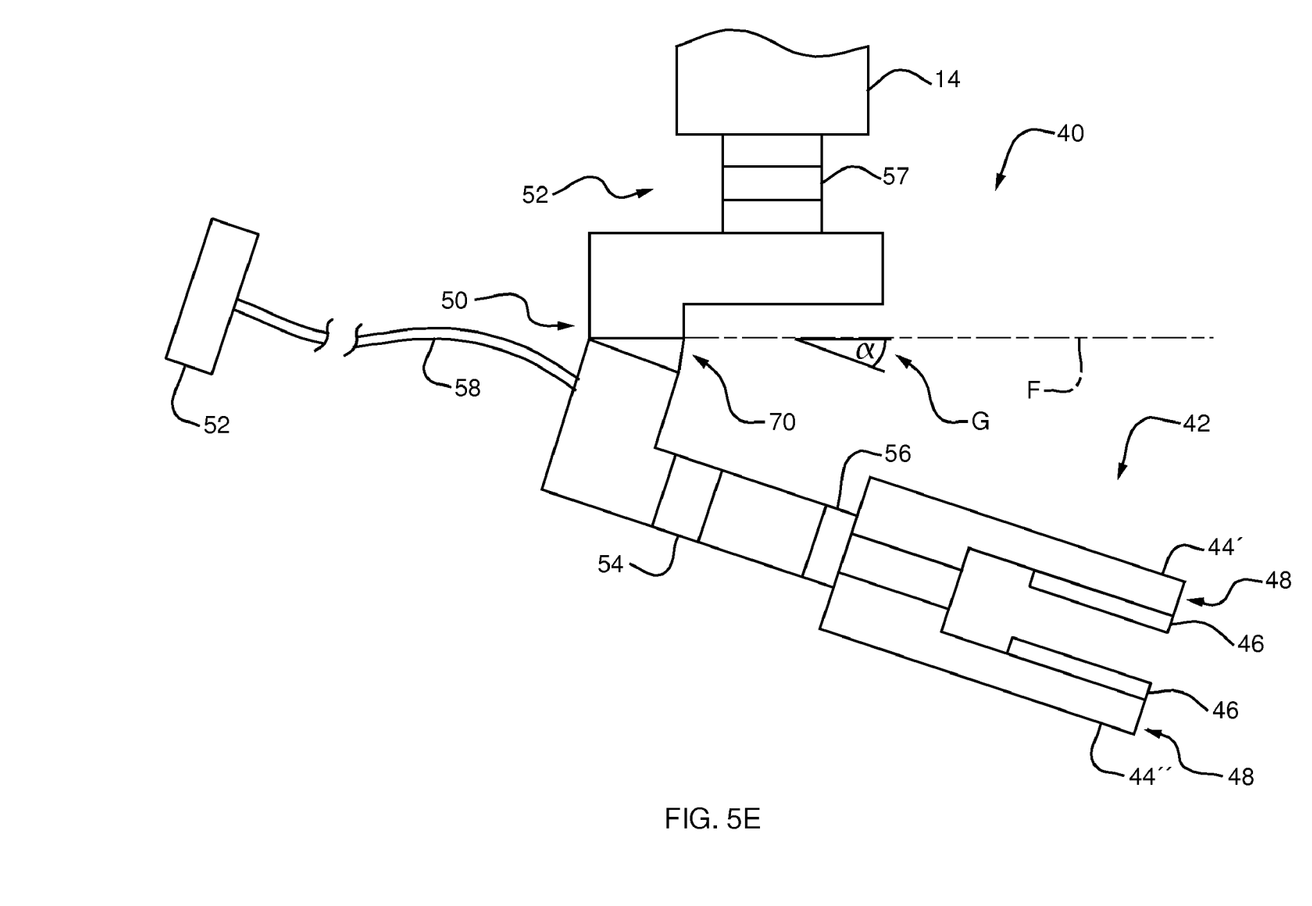
FIG. 5E is a side plan view of yet another embodiment of the gripping tool shown in FIG. 5A having a hinge.
Figure 5G:
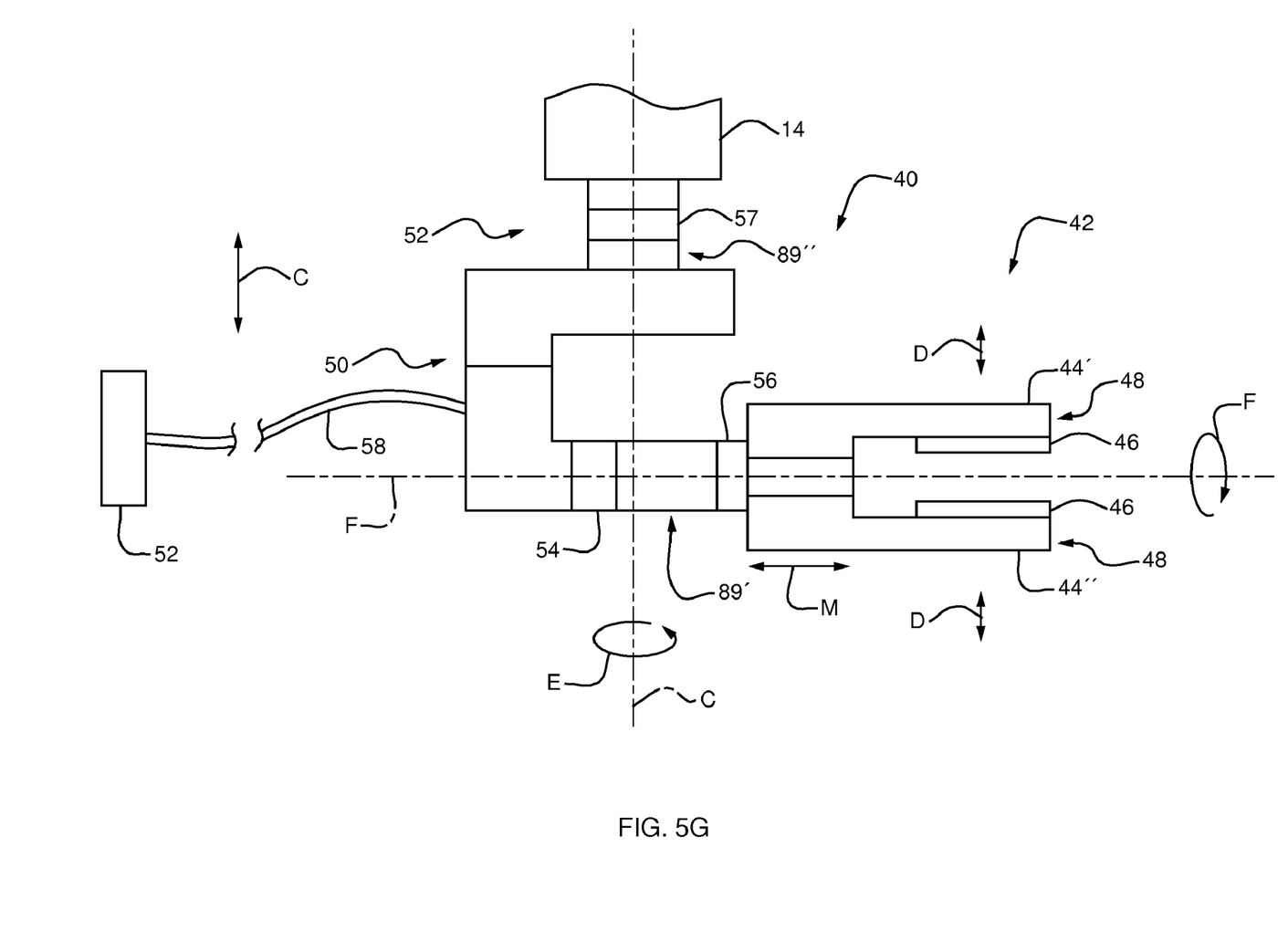
FIG. 5G is a side plan view of the gripping tool shown in FIG. 5A having an a telescopic section.

In yet another embodiment, the gripper tool 40, FIG. 5E, includes a hinge 70 such that the clamping mechanism 42 may move at an angle G with respect to the axis F. This embodiment allows the CNC machine 10 to pick up a workpiece 30 and machine the end faces 72 (FIG. 4). The hinge 70 may include any hinge design known to those skilled in the art. The gripping tool 40, FIG. 5G, may optionally including one or more telescoping or extendable/retractable sections 89. A first extendable/retractable sections 89' allows the clamping mechanism 42 to be extended or retracted substantially along the direction of arrow M. Alternatively, or in addition to, a second extendable/retractable sections 89" allows the clamping mechanism 42 to be movable along the axis C.

Once the first workpiece 30 has be re-indexed and placed within the secondary vice 26, the secondary vice 26 is closed and the first workpiece 30 is secured. The CNC machine 10 then places the gripping tool 40 within the tool head 16 and selects the desired removable machining tool 18 from the tool head 16 and machines the new face 45 of the first workpiece 30 as is well known to those skilled in the art.

This process of re-loading and re-indexing is continued until all the desired faces the first workpiece 30 have been machined. Upon completion of the first workpiece 30, the CNC machine 10 selects the gripping tool 40, grasps the first workpiece 30, and releases the secondary vice 26. The gripping tool 40 then picks up the first workpiece 30 and places it onto a container or conveyer belt 66 to be removed from the CNC machine 10. Using the clamping mechanism 42, the CNC machine 10 may also select a workpiece 30 from the container or conveyer belt 66 at a later time to complete additional machining as necessary.

Once the first workpiece 30 has been removed from the CNC machine 10, the CNC machine 10 automatically reloads the bar stock 20 within the bar and part vices 22, 24 such that the CNC machine 10 may begin to produce a second or subsequent workpiece. According to one embodiment, the bar stock 20 is automatically reloaded by moving the table 12 along the A and B axis such that the removable machining tool 18 is positioned above the bar stock 20 at the desired length on the next workpiece. The spindle 14 is then lowered and the removable machining tool 18 drills a small hole/aperture 62 at least partially within the bar stock 20. The removable machining tool 18 is preferably removed from the spindle 14. A removable pin 87 is then disposed within the spindle 14. The removable pin 87 preferably includes a generally cylindrical body sized and shaped such that at least a portion of the removable pin 87 may be inserted within the hole/aperture 62. Once the removably pin 87 is inserted within the hole/aperture 62, the table 12 is preferably moved along the A and B axis until the bar stock 20 is positioned within the part vice 24 as shown in FIG. 2.

Figure 9:
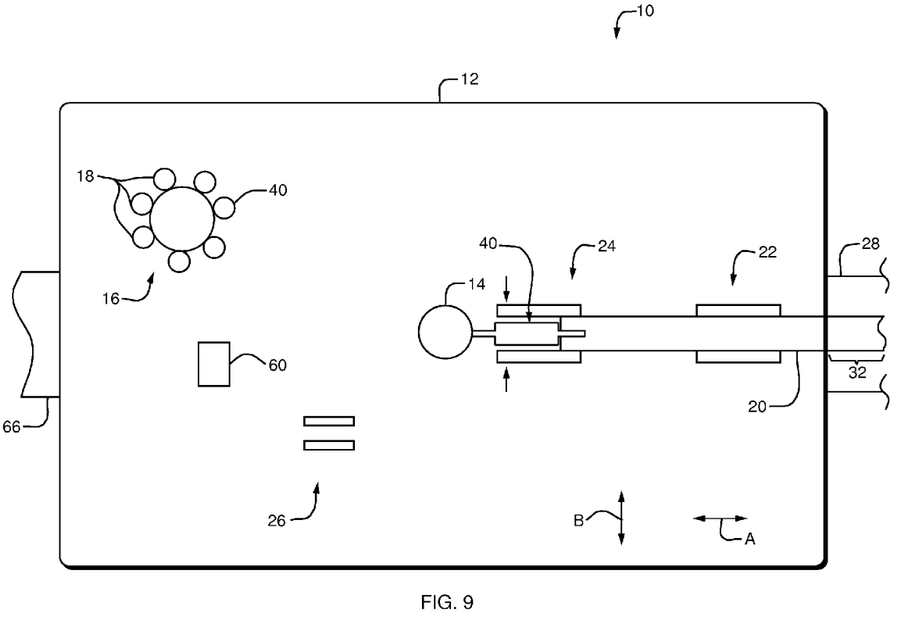
FIG. 9 is a top plan view of the CNC machine re-indexing and reloading the bar stock according to another embodiment of the present invention.

Alternatively, the CNC machine 10 reloads/re-indexes the bar stock by grasping the end 68 of the bar stock 20 with the gripping tool 40, FIG. 9. Next, the table 12 is moved in the A and B axis until the bar stock 20 is positioned within the part vice 24 as shown in FIG. 2. Alternative, the clamping mechanism 42 may move the bar stock 20 using the extendable/retractable section 89. In any event, once the bar stock 20 is in place with respect to the table 12, the bar and part vices 22, 24 are closed, and the process begins over again.

Modifications and substitutions by one of ordinary skill in the art are considered to be within the scope of the present invention, which is not to be limited except by the following claims.

The invention claimed is:

1. A machine tool for a 3-axis CNC machine, said 3-axis CNC machine having a workpiece table configured to move along a first and a second axes, said first and second axes perpendicular to one another and in the same plane, said 3-axis CNC machine having a motor coupled to a spindle, said spindle configured for engaging with a machine tool, for moving said machine tool along a third axis perpendicular to said same plane of said first and second axes, said machine tool configured for engaging with said machine tool comprising:

a support body having a first end sized and shaped to removably engage with said spindle of said CNC machine; and a clamping mechanism disposed about a second end of said support body wherein said clamping mechanism is sized and shaped to grasp a workpiece while said machine tool is disposed within said spindle of said CNC machine, said clamping mechanism coupled to a clamping mechanism controller controlled by said 3-axis CNC machine, said clamping mechanism including first and second jaws configured for gripping said workpiece, said first and second jaws movable inward toward one another and outward away from one another under control of said clamping mechanism controller, said clamping mechanism configured, sized and shaped for engaging with and rotating said workpiece about at least a fourth axis, for allowing said 3-axis CNC machine to automatically provide at least 4-axis milling of said workpiece.

2. The tool as claimed in claim 1 wherein said clamping mechanism includes a magnetic device to grasp said object.

3. The tool as claimed in claim 1 wherein said clamping mechanism includes a suction device to grasp said object.

4. The tool as claimed in claim 1 wherein said clamping mechanism is rotatable about an axis substantially parallel to said workpiece table of said CNC machine.

5. The tool as claimed in claim 1 wherein said clamping mechanism is adapted to move in a direction substantially perpendicular to a table of said CNC machine.

6. The tool as claimed in claim 1 wherein said clamping mechanism is rotatable about an axis of said spindle.

* * * * *